United States Patent
Monroe

(10) Patent No.: US 8,090,641 B1
(45) Date of Patent: *Jan. 3, 2012

(54) SYSTEM AND METHOD FOR TRADING ORDER PRIORITY LEVELS IN AN ELECTRONIC TRADING ENVIRONMENT

(75) Inventor: Fred Monroe, Silver Spring, MD (US)

(73) Assignee: Trading Technologies International, Inc., Chicago, IL (US)

( * ) Notice: Subject to any disclaimer, the term of this patent is extended or adjusted under 35 U.S.C. 154(b) by 1455 days.

This patent is subject to a terminal disclaimer.

(21) Appl. No.: 10/652,377

(22) Filed: Aug. 29, 2003

(51) Int. Cl.
G06Q 40/00 (2006.01)
(52) U.S. Cl. ......................................................... 705/37
(58) Field of Classification Search ...................... 705/37
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 5,297,031 A * | 3/1994 | Gutterman et al. | 705/37 |
| 5,946,388 A * | 8/1999 | Walker et al. | 379/266.01 |
| 5,987,421 A * | 11/1999 | Chuang | 705/7 |
| 6,519,570 B1 * | 2/2003 | Faber et al. | 705/8 |
| 6,772,132 B1 | 8/2004 | Kemp | |
| 6,889,900 B2 * | 5/2005 | Davies et al. | 235/385 |
| 6,987,578 B2 * | 1/2006 | Alexander | 358/1.15 |
| 7,127,424 B2 | 10/2006 | Kemp | |
| 7,228,289 B2 | 6/2007 | Brumfield | |
| 7,389,268 B1 | 6/2008 | Kemp | |
| 7,392,214 B1 * | 6/2008 | Fraser et al. | 705/37 |
| 7,620,576 B1 | 11/2009 | Andrews | |
| 7,747,493 B1 | 6/2010 | Monroe | |
| 7,769,652 B1 | 8/2010 | Monroe | |
| 2002/0022896 A1 * | 2/2002 | Dugan | 700/83 |
| 2002/0184103 A1 | 12/2002 | Shah et al. | |
| 2003/0018563 A1 * | 1/2003 | Kilgour et al. | 705/37 |
| 2004/0030613 A1 | 2/2004 | Fujimoto | |
| 2004/0088242 A1 * | 5/2004 | Ascher et al. | 705/37 |
| 2010/0228643 A1 | 9/2010 | Monroe | |

OTHER PUBLICATIONS

Rosenblum, Daniel M. (1992). Allocation of Waiting Time by Trading in Position on a G/M/S Queue. Operations Research: Supplement,S338. Retrieved Nov. 6, 2007, from ABI/INFORM Global database. (Document ID: 915342).*

Robert E. Dallos (Feb. 5, 1989). Used Jet Market Takes Off Backlog of Orders for New Airliners Fuels Demand for Old Ones :[Home Edition]. Los Angeles Times (pre-1997 Fulltext),p. 1. Retrieved Nov. 6, 2007, from Los Angeles Times database. (Document ID: 66396388).*

(Continued)

*Primary Examiner* — Lindsay M Maguire
*Assistant Examiner* — Jessica Lemieux
(74) *Attorney, Agent, or Firm* — McDonnell Boehnen Hulbert & Berghoff LLP

(57) ABSTRACT

A system and method for trading order priority levels in an electronic trading environment are described. In one embodiment, a trader who is willing to have his order moved from a high priority level to a lower priority level in an order queue may advertise his willingness to do so, and other traders can place bids for the high priority level. In such an embodiment, for example, a bidder who places the highest bid or whose bid is received first may get the high priority level in the order queue in exchange for the paid fee.

21 Claims, 8 Drawing Sheets

OTHER PUBLICATIONS

U.S. Securities and Exchange Commission, Division of Market Regulation, "Special Report: Electronic Communication Networks and After-Hours Trading," Jun. 2000, available at http://www.sec.gov/news/studies/ecnafter.htm.

U.S. Securities and Exchange Commission, "NASD Rulemaking: Notice of Filing of Amendment No. 8 to Proposed Rule Change by National Associate of Securities Dealers, Inc. Relating to the Establishment of Nasdaq Order Display Facility and to Modifications of the Nasdaq Trading Platform," Release No. 34-43514; No. SR-NASD-99-53, Nov. 3, 2000, available at http://sec.gov/rules/sro/nd9953n5.htm.

U.S. Appl. No. 10/452,567, filed May 30, 2003, and currently pending.

Non-Final Office Action mailed Apr. 2, 2008 in U.S. Appl. No. 10/652,180. (5 pages).

Final Office Action mailed Oct. 2, 2008 in U.S. Appl. No. 10/652,180. (16 pages).

Non-Final Office Action mailed Mar. 30, 2009 in U.S. Appl. No. 10/652,180. (20 pages).

Notice of Allowance mailed Dec. 7, 2009 in U.S. Appl. No. 10/652,180. (6 pages).

Supplemental Notice of Allowance mailed Jan. 14, 2010 in U.S. Appl. No. 10/652,180. (3 pages).

Non-Final Office Action mailed Feb. 11, 2008 in U.S. Appl. No. 11/416,462. (4 pages).

Final Office Action mailed Oct. 2, 2008 in U.S. Appl. No. 11/416,462. (16 pages).

Non-Final Office Action mailed Mar. 18, 2009 in U.S. Appl. No. 11/416,462. (17 pages).

Notice of Allowance mailed Mar. 8, 2010 in U.S. Appl. No. 11/416,462. (6 pages).

Non-Final Office Action mailed Dec. 10, 2010 in U.S. Appl. No. 12/780,770. (6 pages).

Notice of Allowance mailed May 17, 2011 in U.S. Appl. No. 12/780,770. (7 pages).

Non-Final Office Action mailed Feb. 26, 2008 in U.S. Appl. No. 11/415,401. (6 pages).

Final Office Action mailed Nov. 17, 2008 in U.S. Appl. No. 11/415,401. (11 pages).

Non-Final Office Action mailed Jul. 9, 2009 in U.S. Appl. No. 11/415,401. (12 pages).

Final Office Action mailed Feb. 1, 2010 in U.S. Appl. No. 11/415,401. (14 pages).

* cited by examiner

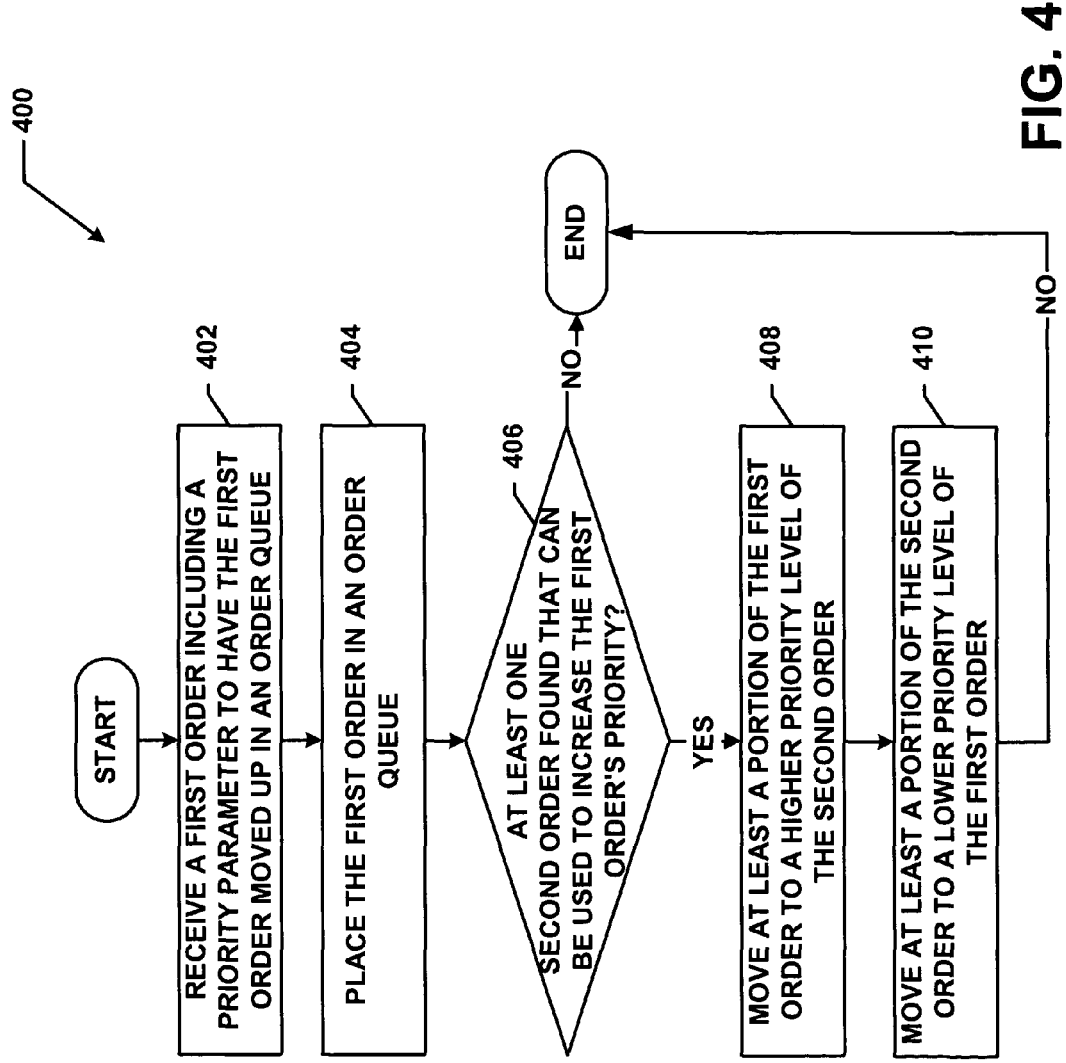

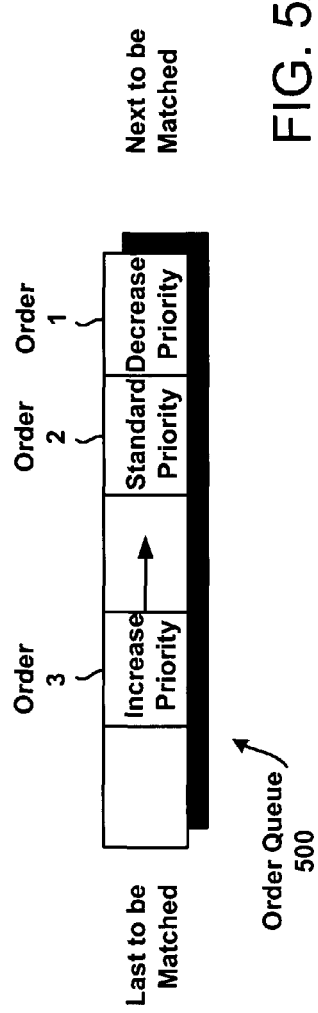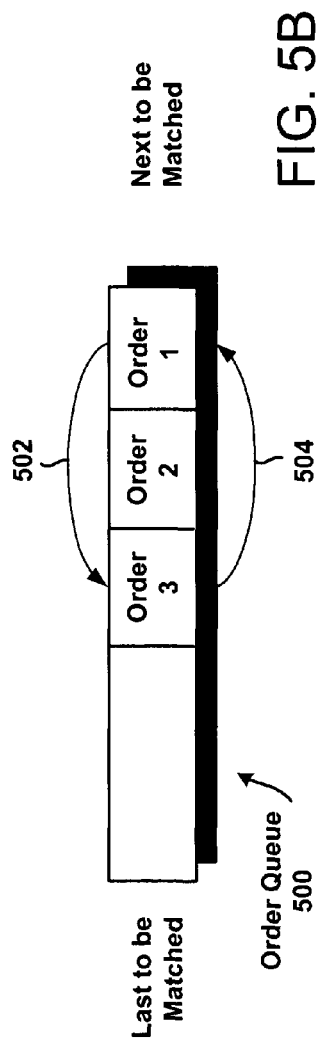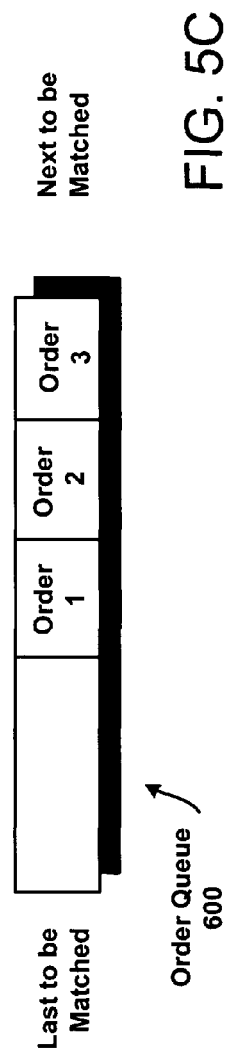

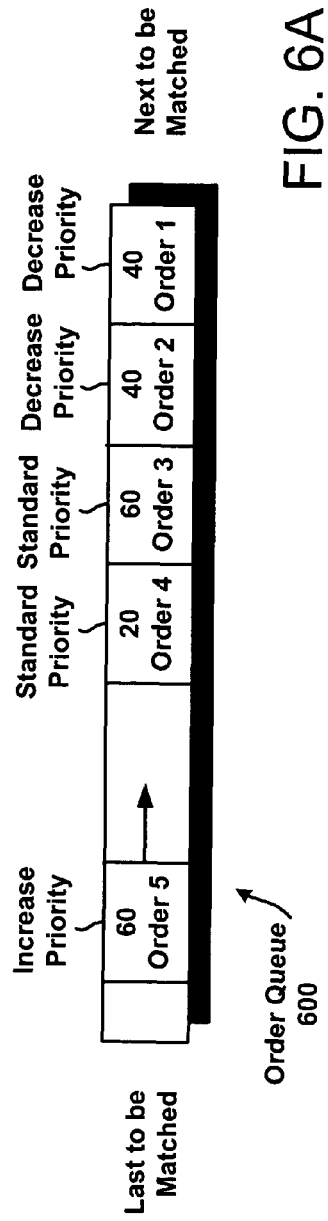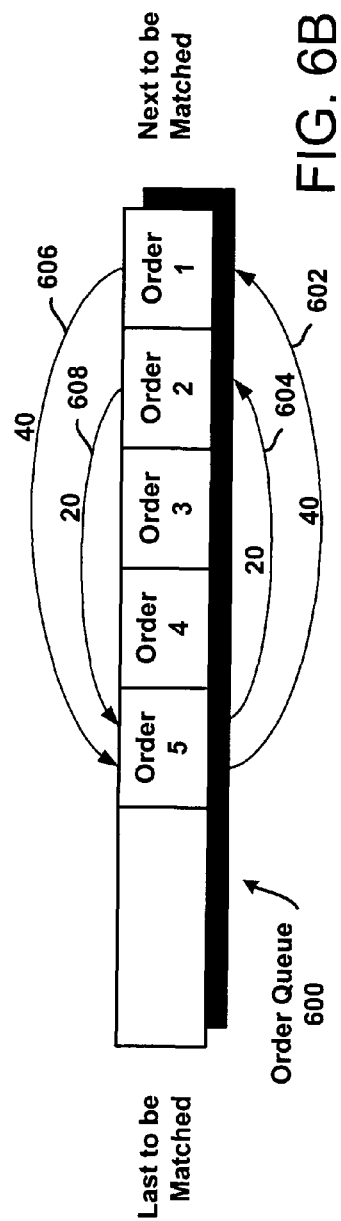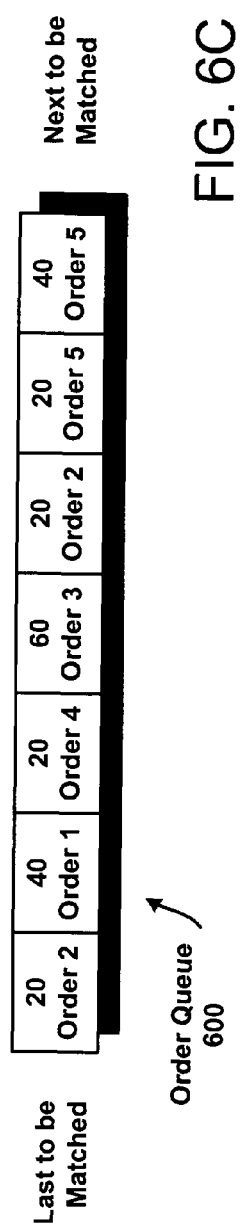

SYSTEM AND METHOD FOR TRADING ORDER PRIORITY LEVELS IN AN ELECTRONIC TRADING ENVIRONMENT

FIELD OF INVENTION

The present invention is directed towards electronic trading. More specifically, the present invention is directed towards providing means for trading order priority levels in an electronic trading environment.

BACKGROUND

In recent years, a trend towards electronic trading has become well-established, causing one major exchange after another to replace or at least supplement the traditional open outcry, where a trade is done face to face, with automated, electronic systems which automatically match bids and offers. While the motivation behind using electronic trading may vary from market to market, greater efficiency and volume are some of the considerations.

Electronic trading is generally based on a host exchange, one or more computer networks and client devices. In general, the host exchange includes one or more centralized computers to form the electronic heart. The exchange allows a trader to participate in trading at least one electronic market, and conducts matching of bids and offers being placed by the subscribing traders for that market. Typically, subscribing traders connect to an exchange by way of a communication link and through an application program interface to establish real-time electronic messaging between the exchange and their terminals. The real-time electronic messaging includes market information that is sent from an electronic market to the traders.

An electronic exchange can list any number of markets. Often times, traders will trade simultaneously in more than one market, and they may trade simultaneously in markets that are listed at more than one exchange. Ordinarily, each market has its own electronic market, and therefore, its own separate stream of market information. Therefore, in these instances, the traders will generally receive more than one stream of market information such that each stream of market information attempts to characterize a given market. In addition to receiving market information from exchanges, a trader might subscribe to news feeds to receive real-time quotations that may assist the trader in making their trading decisions.

Generally, when a trader submits an order to a host exchange, the host checks the conditions associated with the order, for example, price and quantity, and prioritizes the order with other orders of the same price. When the order conditions are satisfied in the market, a trade occurs and trade information is then relayed in some fashion to one or more client devices. In fact, the host exchanges typically publish a data feed to the client devices so that the traders can have access to the most current market information.

Market information commonly includes information regarding the inside market and market depth. The inside market is the lowest sell price in the market and the highest buy price in the market at a particular point in time. Market depth refers to quantities available at the inside market and may also refer to quantities available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for all or many price levels, while some provide only quantities associated with the inside market, and others may provide no market depth at all. Additionally, host exchanges can offer other types of market information such as the last traded price ("LTP"), the last traded quantity ("LTQ"), and order fill information.

The costs of electronic trading are in general much lower than those being incurred by traders who trade on the open outcry exchanges. Unlike open outcry systems, electronic trading no longer requires brokers or clerks, and reduces overhead costs including building, staffing, and back-office costs associated with the open outcry exchanges. However, in both, electronic and open outcry exchanges, member firms and individual traders bear the fixed costs of operations, which are paid regardless of the volume traded. In addition to the fixed costs, traders incur per each trade costs or per each share costs for orders that are executed at an electronic exchange, which further decrease trader's profits.

Regardless of the type of matching algorithm used by the electronic market, traders have limited means to control order positions in an order queue at an electronic exchange or costs incurred per each trade. Thus, it is still desirable for electronic trading applications to offer tools that can assist a trader in trading in an electronic trading environment, help making profitable trades in a speedy and accurate manner, while allowing the trader to conveniently control his/her order positions at an exchange, as well as to provide flexibility in controlling costs incurred per each trade.

BRIEF DESCRIPTION OF THE DRAWINGS

Example embodiments of the present invention are described herein with reference to the following drawings, in which:

FIG. 4 is an example flow chart illustrating one example method for changing priority levels of orders in an electronic trading environment;

FIGS. 5A-5C are block diagrams that attempt to graphically illustrate the process of moving orders between different priority levels in an order queue;

FIGS. 6A-6C are block diagrams that attempt to graphically illustrate the process of moving an order to a higher priority level using two or more orders in an order queue;

DETAILED DESCRIPTION

I. Order Priority Level Modification

Figure 1:
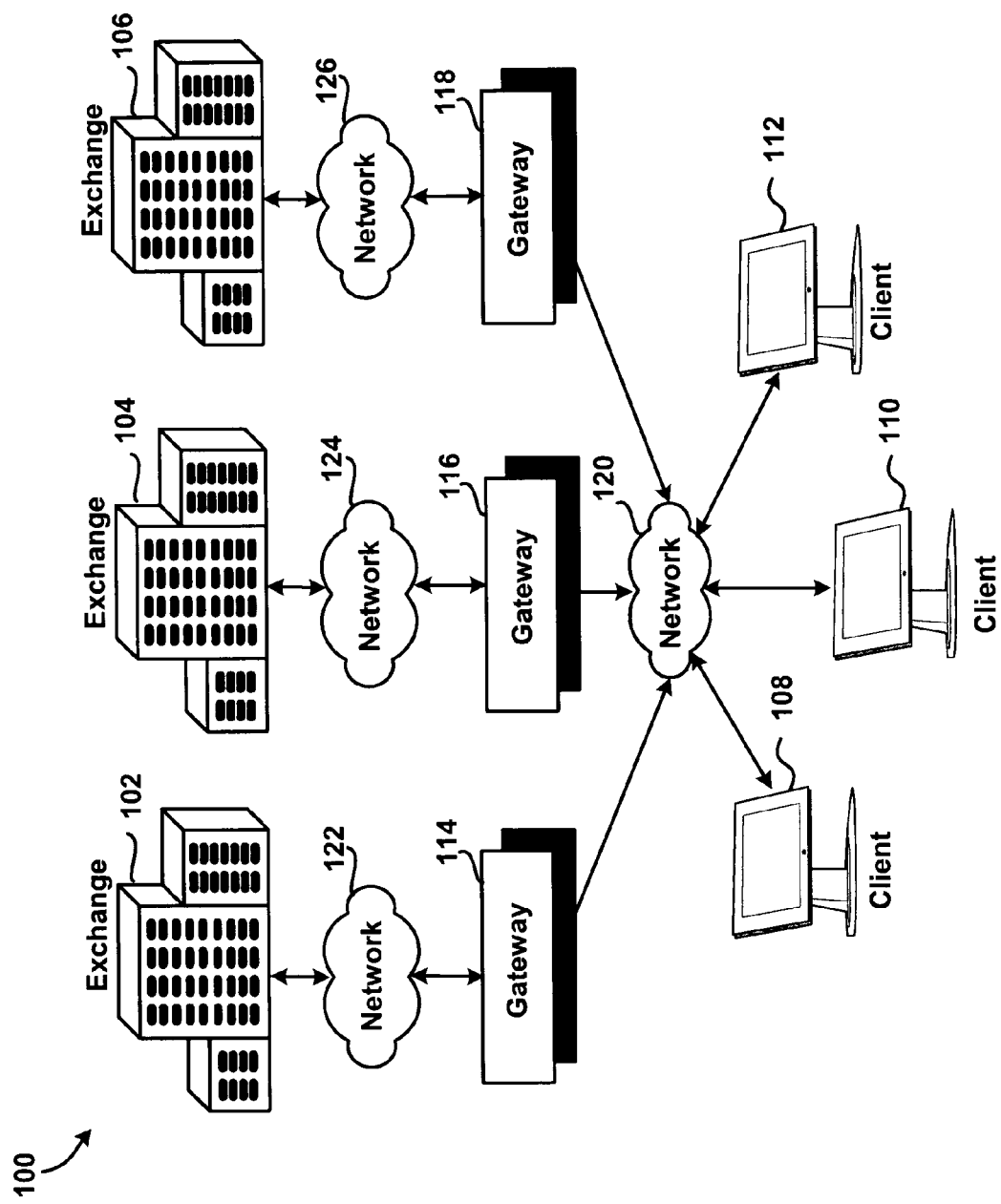
FIG. 1 is an example network configuration for a communication system utilized to access one or more exchanges.

Typically, an electronic exchange maintains an exchange order book that represents unexecuted buy and sell orders for a particular tradeable object. A matching engine at the exchange attempts to match the incoming orders to those orders resting in the exchange order book. If there is no match, the orders are preferably sorted by a matching algorithm such as by price and time priority. In particular, the exchange's logic sorts the orders into the appropriate price queue where the orders rest until they are matched by the matching engine or until the orders are deleted or changed by the trader, for example.

According to a preferred embodiment, an order that is sent to an exchange includes a parameter enabling a trader to define the trader's priority preferences for the order. For example, the parameter may define (i) a trader's preference to have his order moved up to a higher priority level, if possible, or (ii) a trader's willingness to have his order moved down to a lower priority level in certain situations. In such an embodiment, when an exchange receives an order including an order parameter defining a trader's preference to have his order moved up to a higher priority level, the exchange may first determine whether there are any orders in an order queue that can be moved to a lower priority level of the received order. More specifically, the exchange determines whether there is any order including an order parameter defining that the order can be moved down to a lower priority level. It should be understood, and as will be described in greater detail below, a trader who defines his willingness to have his order moved to a lower priority level may limit how far down his order can be moved in the order queue in terms of the priority level, and/or how many times his order can be moved so that the order is not moved to lower priority levels indefinitely. However, it should be understood that the example embodiments described herein are not limited to moving orders in an order queue. Alternatively, each order may be associated with an indicator defining a priority level for each order in an order queue, and the priority level indicator may define a percentage of the order to be filled during each round of fills until the order is fully filled, for example.

Also, preferably, the trader who is gaining a higher priority level will be charged a fee for having his order priority increased, and a trader who is giving up his priority level will receive a payment. The fee may be a direct fee, such as when a payment is directly transferred between the trader's accounts, or it could be an indirect fee, such as when a commission is first transferred to an exchange, and then the exchange applies a credit to an account of a trader whose order was transferred to a lower priority level. Also, it should be understood that, regardless of the way the fee is transferred between the traders' accounts, an exchange could also collect a fee for changing priority levels of the traders' orders in an order queue. Also, as will be described in greater detail below, the fees may be based on many different criteria including time of day, an order quantity to be transferred to the higher order priority, differences in priority levels of two orders, or any other user-configurable criteria, for example.

Also, a trader who is willing to have his order moved from a high priority level to a lower priority level in an order queue may advertise his willingness to do so, and other traders can place bids for the high priority level. In such an embodiment, for example, the trader willing to sell his high priority level may define a minimum price for which the priority level can be bought, and the bidder who places the highest bid or whose bid is received first may get the high priority level in the order queue in exchange for the paid fee.

While the present invention is described herein with reference to illustrative embodiments for particular applications, it should be understood that the present invention is not limited thereto. Those having ordinary skill of art will recognize that many additional modifications and embodiments are possible as well.

II. Hardware and Software Overview

FIG. 1 is a block diagram illustrating an example trading system 100 in accordance with the preferred embodiments. The system 100 includes one or more exchanges 102, 104, 106 and one or more client devices 108, 110, 112. Intermediate devices such as gateways 114, 116, 118, routers (not shown), and other such types of network devices may be used to connect network 120 to networks 122, 124, and 126 so that client devices 108, 110, 112 and exchanges 102, 104, 106 can communicate market information. It should be understood that the present invention is not limited to any particular system configuration. For example, networks 122, 124, and 126 could represent the same network, network 120 could represent the same network as networks 122, 124, and 126, or client devices 108, 110, 112 could connect separately to gateways 114, 116, 118. Of course, the preferred embodiments may be implemented on many other system configurations.

A. Exchange

Any of exchanges 102, 104, 106 may represent, for example, the London International Financial Futures and Options Exchange ("LIFFE"), the Chicago Board of Trade ("CBOT"), the New York Stock Exchange ("NYSE"), the Chicago Mercantile Exchange ("CME"), the Exchange Electronic Trading ("Xetra," a German stock exchange), or the European Exchange ("Eurex"), or any other exchange that participates in electronic trading. Exchanges 102, 104, 106 might also refer to other facilities, which include basic or more complex systems that automatically match incoming orders. These example exchanges and other exchanges are well known in the art. Communication protocols required for connectivity to one of these exchanges are also well known in the art.

Exchanges 102, 104, 106 allow traders to log into a market to trade tradeable objects. As used herein, the "tradeable object" refers simply to anything that can be traded with a quantity and/or price. It includes, but is not limited to, all types of tradeable objects such as financial products, which can include, for example, stocks, options, bonds, futures, currency, and warrants, as well as funds, derivatives, and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable object, such as a class of tradeable objects.

An exchange 102, 104, 106 can implement numerous types of order execution algorithms, and sometimes the type of algorithm depends on the tradeable object being traded. Preferably, the example embodiments can be adapted by one skilled in the art to work with any order execution algorithms. Some example order execution algorithms include first-in-first-out ("FIFO") and pro rata algorithms. The FIFO algorithm, used for some tradeable objects listed with Eurex, for example, gives priority to the first person in an order queue at an exchange to place an order. The pro rata algorithm, used for some tradeable objects listed with LIFFE, for example, splits orders for the same price, and the orders at identical prices are filled in proportion to their size. Also, the present invention is not limited to any particular type of order execution algorithm. It should also be understood that the order queue is a term that covers any type of data structure and/or memory storage system used by a exchange to conduct orderly financial transactions in a broad range of systems such as, for example, FIFO or pro rata systems.

Regardless of the type of order execution algorithm used, each exchange 102, 104, and 106 preferably provides similar types of information in market updates found in their data feeds to subscribing client devices 108, 110, and 112. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. The extent of the market depth available to a trader usually depends on the exchange. For instance, some electronic exchanges provide market depth for all (or most) price levels, some exchanges provide market depth for a finite number of price levels, while some exchanges provide only quantities associated with the inside market, and others may provide no market depth at all. Additionally, exchanges 102, 104, 106 can offer other types of market information, for example, the last traded price ("LTP"), the last traded quantity ("LTQ"), total traded quantity ("TTQ"), and order fill information. It should be understood that the present invention is not limited to receiving and analyzing a data feed consisting of market updates. One skilled in the art would recognize upon reading the description herein that the present invention has utility in any trading application where any particular type of data feed is provided.

B. Gateway

Gateways 114, 116, and 118 are devices such as a mainframe, super minicomputer, workstation, or microcomputer that connect network 120 to networks 122, 124, 126 so that market information can be successfully passed between client devices 108, 110, 112 and exchanges 102, 104, 106. Gateways 114, 116, 118 receive market information from exchanges 102, 104, 106 and convert it to a form compatible with the protocols used by client devices 108, 110, 112 using conversion techniques known in the art. Also, as known by those skilled in the art, gateways 114, 116, and 118 may have one or more servers to support the data feeds, such as a price server for processing price information, an order server for processing order information, and a fill server for processing fill information. A trader at one of client devices 108, 110, and 112 can subscribe to price information, order information, and fill information for a particular market hosted at exchanges 102, 104, 106. Gateways 114, 116, 118 also receive transaction information, such as orders, order changes, queries, etc., from client devices 108, 110, 112 and forward that information to corresponding exchanges 102, 104, and 106.

C. Client Device

Client devices 108, 110, 112 are devices that provide an interface for traders to trade at one or more markets listed with one, some, or all of exchanges 102, 104, 106. Some exchanges of client devices include a personal computer, laptop computer, hand-held computer, and so forth. Client devices 108, 110, 112, according to the preferred embodiments, include at least a processor and memory. The processor and memory, which are both well-known computer components, are not shown in the Figure for sake of clarity. Preferably, the processor has enough processing power to handle and process various types of market information. Of course, the more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include dynamic memory, such as main memory or random access memory ("RAM"). Common forms of computer-readable media include, for example, floppy disks, flexible disks, hard disks, magnetic tape, punch cards, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

Client devices 108, 110, 112 receive market information from any of exchanges 102, 104, 106. According to the preferred embodiment, market information is displayed to the trader(s) on the visual output device or display device of client devices 108, 110, 112. The output device can be any type of display. For example, the display could be a CRT-based video display, an LCD-based or a gas plasma-based flat-panel display, a display that shows three-dimensional images, or some other type of display. The present invention is not limited to any particular type of display.

Upon viewing the market information or a portion thereof, a trader may wish to send orders to an exchange, cancel orders in a market, change orders in a market, query an exchange, and so on. To do so, the trader may input various commands or signals into the client device 104, for example, by typing into a keyboard, inputting commands through a mouse, or inputting commands or signals through some other input device. Upon receiving one or more commands or signals, client devices 108, 110, 112 preferably generate transaction information. For instance, a trader may click a mouse button to initiate an order to buy a tradeable object. Then, transaction information would include an order to buy a particular quantity of the tradeable object at a particular price. There are many different types of messages and/or order types that can be submitted, all of which may be considered various types of transaction information. Once generated, transaction information is sent from client device 104 to host exchange 102 over network(s) 120, 122, 124, 126.

Figure 2:
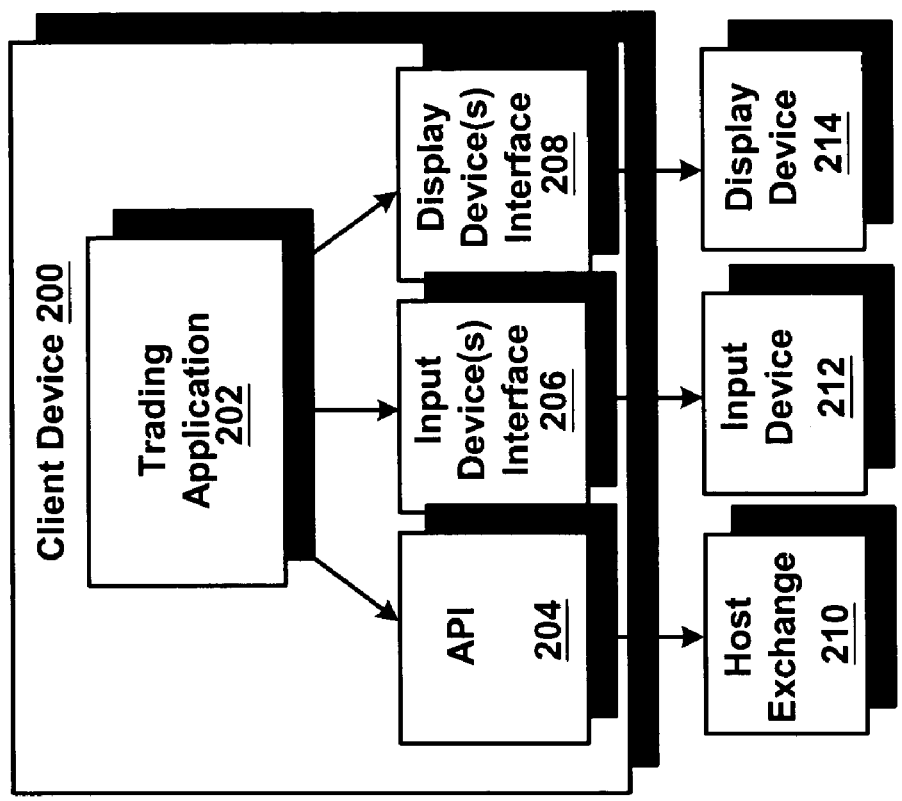
FIG. 2 is a block diagram illustrating an example client device that can be used in the example network of FIG. 1.

FIG. 2 is a block diagram illustrating an example client device 200 which may be similar to the type of client devices 108, 110, and 112 shown in FIG. 1. The client device 200 can be any particular type of computing device, examples of which were enumerated above with respect to the client device. According to the preferred embodiments, the client device 200 has a trading application 202 stored in memory that when executed arranges and displays market information in many particular ways, usually depending on how the trader prefers to view the information. The trading application 202 may also implement the preferred embodiments described herein. Alternatively, the preferred embodiments described herein may occur elsewhere such as outside of the trading application 202 on the client device 200, on a gateway, or on some other computing device. Preferably, the trading application 202 has access to market information through an API 204 (or application programming interface), or the trading application 202 could also forward transaction information to the exchange 210 via the API 204. Alternatively, the API 204 could be distributed so that a portion of the API rests on the client device 202 and a gateway, or at the exchange 210. Additionally, the trading application 202 may receive signals from an input device 212 via an input device interface 206, and can be given the ability to send signals to a display device 214 via a display device interface 208.

III. Order Priority Level Modification

1. FIFO System

When an incoming order arrives at an exchange, a matching engine attempts to match some or all of the incoming order, depending on the order's size and what is available in the market, to the quantity resting in the exchange's order book. If the quantities are not matched immediately, the arriving orders are sorted by price and time priority, for example, into the order queue where the orders rest until they are matched by the matching engine, or until the orders are deleted or changed by the trader, for example. Using a FIFO based system, a new order is placed in the back of the price order queue by the exchange's logic, and the order does not get filled until all other orders in front of the order queue are matched.

According to a preferred embodiment, an order that is sent to an exchange may include a priority parameter defining a trader's priority preference. The priority preference may define a trader's preference to have his order moved up in an order queue, or may define trader's willingness to have his order's priority moved down in an order queue. Also, it should be understood that the priority parameter may include a simple request to have an order moved to the highest possible priority in an order queue. Alternatively, the priority parameter may include a plurality of conditional rules defining when an order should be moved to a higher priority level. For example, a trader may wish to have his order moved up to a higher priority level only if there is a specific number of orders, such as ten or more orders, in front of the trader's order in an order queue. Alternatively, rather than increasing the order's priority level in an order queue based on the number of orders in front of a trader's order in an order queue, such determination may be based on an overall order quantity in front of the order in the order queue.

In addition to defining when an exchange should attempt to increase the order's priority level in an order queue, a trader could also define a maximum fee that the trader is willing to pay to have his order moved up in the order queue. Such an embodiment may be especially useful when a fee that is applied for changing the orders' priority levels depends on a distance between an order that is moved to a higher priority level and an order that is moved to a lower priority level. Alternatively, rather than determining an applicable fee based on a distance between two orders in an order queue, the fee could additionally depend on an order quantity corresponding to other orders positioned between the two orders. In such an embodiment, the cost of moving an order up to a higher priority position in an order queue may be higher if intermediate orders have higher order quantities than if the intermediate orders have lower order quantities.

Figure 3:
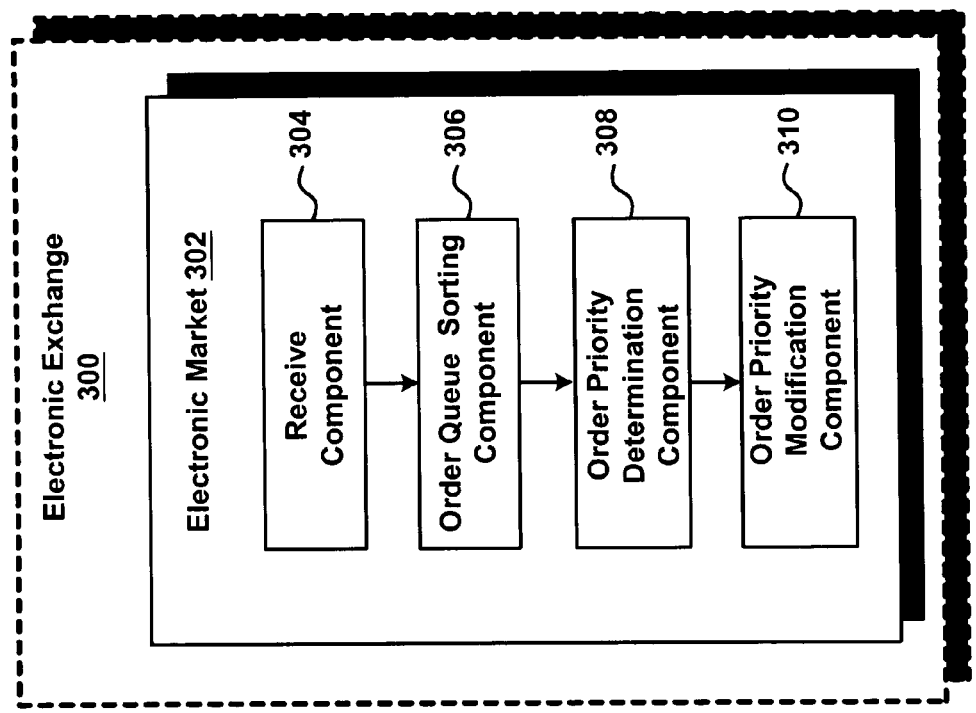
FIG. 3 is a block diagram illustrating an example electronic exchange that can be used in the example network of FIG. 1.

FIG. 3 is a block diagram illustrating an electronic exchange 300 that provides at least one electronic market 302 with various components 304, 306, 308, and 310 for carrying out the present embodiments. The electronic market 302 is listed at the electronic exchange 300. The electronic market 302 includes a receive component 304, an order queue sorting component 306, an order priority determination component 308, and an order priority modification component 310. The receive component 304, the order queue sorting component 306, the order priority determination component 308, and the order priority modification component 310 may include software and hardware elements to perform their functions. It should be understood, however, that the electronic exchange 300 and the electronic market 302 may include more or fewer components that are not shown in FIG. 3. Also, each of the illustrated components may be combined with other components. For instance, some or all of the components 304, 306, 308, and 310 may be combined with a matching engine component (not shown) of a particular market.

According to an example embodiment, a trader may define priority levels for one or more orders using different methods. For example, a trader may define one or more priority preference parameters for each individual order that he/she submits to an exchange via a graphical interface, selection inputs available via a trading interface, or any other means. Alternatively, rather than defining priority preferences for each order, a trader may select global priority preferences at the beginning of a trading session, and the selected priority preferences may control all orders that the trader submits for a tradeable object to a specific exchange during a trading day.

Also, it should be understood that instead of a trader defining priority preferences for each order or a group of orders that are sent to an exchange during a trading session, any network entity on the path between the client device and the electronic exchange may automatically insert preferred priority preference identifier or order parameter to each order being sent to one or more exchanges. For example, a trader's service subscription can identify a preferred priority level for each order that the trader sends to one or more exchange for specific tradeable objects. In such an embodiment, a gateway could be configured to insert certain priority level indicators to each order being sent by such a trader to the specified exchanges. Also, a trader could configure different priority preferences to be applied to orders being sent to different exchanges and for different tradeable objects. Those skilled in the art will understand that many different configurations are possible as well.

Also, rather than a trader defining priority levels for each order that the trader sends to an exchange, an exchange can offer a plurality of order types associated with different priority levels. In such an embodiment, when a trader wishes to request the highest priority level, the trader may select an order type associated with the highest priority request for a certain tradeable object.

The receive component 304 receives an incoming order for one or more tradeable objects being traded in the electronic market 302 at the electronic exchange 300. According to one preferred embodiment, the order is received in an order request message including an order quantity and a priority preference parameter. Preferably, a trader defines and sends the order request message electronically to the exchange 300. When the exchange 300 receives the order request message, the order queue sorting component 306 may sort the order based on its price level into a predetermined order queue associated with the order price.

According to one embodiment, the sorting component 306 may sort the order by price and time priority, e.g., in a FIFO system, into the price order queue. Using the FIFO based system, the order queue sorting component 306 places the new order on the back of the order queue. Alternatively, using the pro-rata system, the order is placed into an order queue associated with the specified order price, and the order is filled based on a proportion of an order quantity in relation to other order quantities in the order queue, the embodiments of which will be described in greater detail in the next section.

When an order is placed in an order queue in a FIFO system, the order priority determination component 308 may determine an order priority level based on a current position of the order in the order queue. Such determination may not only be based on a position of the order in the order queue, but also based on a total order quantity available for matching when the market reaches the price level associated with the orders, and based on the size of the order compared to other pending orders at the same price in front of the order. Then, in a pro-rata system, the order priority determination component 308 may base its priority determination on a portion of an order that will potentially get filled during one or more matching rounds required to fill the order quantity in full.

Once the order priority determination component 308 compares the priority preferences of the order in relation to the current position of an order in an order queue, the order priority modification component 310 may compare the current order priority level with the priority preferences specified in the order message. In a FIFO based system, the order priority modification component 310 may attempt to move the order up in the order queue by moving the order to a desired position in the order queue. As mentioned earlier, the order priority modification component 310 may attempt to move the order to the highest possible priority level based on available orders that can be moved down to a lower priority level associated with the order. Alternatively, the order priority modification component 310 may resolve where the order should be moved in an order queue based on the priority preference limitations specified in the order message. For example, if the priority preference limitations define a maximum fee that a trader is willing to pay for increasing his order's priority level, the order priority modification component 310 may use that limitation to determine an optimal queue position for the order in the order queue.

In addition to any limitations that a trader may specify in an order message, the order priority modification component 310 could also be limited by other factors when moving orders to higher priority levels. In one embodiment, an order quantity of an order at a higher priority level to which the order priority modification component 310 attempts to transfer another order may control how much quantity can be transferred to the order's position in an order queue. For example, if an order quantity of an order to be used to increase another order's priority level is 20, and an order quantity of the order to be transferred to the higher priority level is 40, only the order quantity of 20 will be transferred to the higher priority level. In such an embodiment, more than one order could be used to move the order to the higher priority level.

Also, if an order quantity of an order at a lower priority level is lower than an order quantity of an order at a higher priority level, only a portion of the order quantity at the higher priority level could be replaced with the order quantity of the order that was initially at the lower priority level. In such an embodiment, a fee that is applied for transferring the order to a higher priority level may depend on an order quantity being transferred to the higher priority level. For example, a trader willing to have an order moved to a lower priority level may define a number of limitations to control how many orders can be transferred to the order's position in an order queue. Alternatively, the order priority modification component 310 could be limited to moving a single order to a higher priority position in an order queue as long as the order that is moved to the higher priority position has an order quantity equal to or lower than an order quantity of the order originally at that priority level.

FIG. 4 is a flow chart illustrating one example method 400 for increasing a priority level of an order in an electronic trading environment. However, it should be understood that the flowchart in FIG. 4 provides only an illustrative description of one method for increasing priority levels of orders in an order queue, and that more or fewer steps may be included in the flowchart, and the steps may occur in one or more orders that are different from the orders of the steps shown in FIG. 4. Also, the steps of the method 400 may be performed by the components described in relation to FIG. 3. However, it should be understood that any other network components located at one or more network entities could be used to perform the method 400.

At step 402, an electronic exchange receives a first order including one or more priority parameters defining priority preferences to have the order moved up in an order queue to a higher priority level. As mentioned in earlier paragraphs, the priority preferences may define a number of criteria that can be used to determine a desired priority level for the order. For example, the priority preference may simply define a request to move the order to the highest possible and available priority level in an order queue. Alternatively, the priority preferences may include a number of limitations, such as cost limitations, that may limit how far the order can be moved in an order queue. Also, the priority preferences may define when the order should be moved to a higher priority level. For example, a trader may want to have his order moved to a higher priority level only when the number of orders in front of the trader's order in an order queue reaches a predetermined number, or when an order quantity in front of the trader's order reaches a predetermined level. However, it is assumed in the method 400 that when the first order reaches the exchange, the priority level of the order is to be increased.

At step 404, the order is placed in an order queue. At step 406, an order priority modification component or any other component in a matching engine, for example, may determine if there is at least one second order in the order queue that can be used to increase the first order's priority level. If no such order is found, the method 400 terminates. If at least one order is found that can be used to increase the first order's priority level, at step 408, at least a portion of the first order is moved to a higher priority level in an order queue associated with the second order. At step 410, at least a portion of the second order is moved to a lower priority level of the first order. It should be understood that even though the flow chart 400 illustrates the last two steps separately, the steps could be performed simultaneously.

Typically, order queue information is in electronic form, such as in computer memory. However, FIGS. 5A-5C attempt to graphically illustrate the process of moving orders between different priority levels in an order queue 500 for purposes of explanation. Referring to FIG. 5A, the order queue 500 includes three orders, Order 1, Order 2, and Order 3. Order 1 is in front of the order queue 500 and is next to be matched assuming the market moves to the price level represented by the order queue. Also, Order 1 is associated with a "Decrease Priority" identifier indicating that Order 1 can be moved down to a lower priority level. The next order to be filled in the order queue 500 is Order 2 that is associated with a "Standard Priority" indicating that Order 2 is not to be moved up or down in the order queue 500. Order 3 is an incoming order that will be placed at the back of the order queue 500. Also, Order 3 is associated with an "Increase Priority" identifier indicating that Order 3 should be preferably moved up to a higher priority level. It should be understood, and as mentioned in earlier paragraphs, the Increase Priority Identifier may be associated with a number of priority preference parameters; however, in this example, it is assumed that the priority preference parameters include a request to have the order moved to the best available priority level in the order queue 500.

FIG. 5B illustrates an arrangement of orders in the order queue 500 once Order 3 is placed in the order queue 500. In a FIFO system, Order 3, as illustrated in FIG. 5B, would preferably be placed at the back of the order queue 500. Then, once Order 3 is placed in the order queue 500, the order priority modification component 310 may attempt to increase the order priority of Order 3. Since the priority level of Order 1 can be decreased, as described in FIG. 5A, the order priority modification component 310 may attempt to change priority levels of Order 1 and Order 3 in the order queue 500, as illustrated at 502 and 504, respectively. It should be understood that before moving the orders, the order priority modification component 310 may first determine if there are any order priority limiting parameters associated with Order 1, such as the lowest priority to which Order 1 can be transferred in the order queue 500. Alternatively, or in addition to defining the lowest priority level, Order 1 could define how many times it could be moved to lower priority levels. It should be understood that in example embodiments presented herein, the process of changing priority levels of orders in an order queue may be accomplished using many different methods. For example, positions of two or more orders in an order queue may be swapped such that a first order is moved to a position of a second order in an order queue, and the second order is moved to a position of the first order in the order queue. Alternatively, rather than moving orders in the order queue, order parameters of the two orders can be exchanged such that the ownership, for example, a trader's identification specified in the order, as well as any other order parameters can be dynamically changed. If Order 1 can be transferred to the queue position of Order 3, the order priority modification component 310 may proceed with changing priority levels of Orders 1 and 3, as illustrated at 502 and 504. Otherwise, Orders 1 and 3 remain at their positions in the order queue 500.

FIG. 5C illustrates positions of Order 1 and Order 3 in the order queue 500 once the order priority modification component 310 changes priority levels of the two orders. Thus, as illustrated in FIG. 5C, Order 3 is now in front of the order queue, Order 2 has not changed its position, and Order 1 is now the third order to be filled in the queue.

As mentioned in earlier paragraphs, two or more orders can be used to change another order's priority level to a higher priority level. Such an embodiment may be applied when an order quantity to be transferred to a higher priority level is limited by an order quantity of an order at that higher priority level. FIGS. 6A-6C attempt to graphically illustrate the process of moving an order to a higher priority level using two or more orders in an order queue for purposes of explanation.

Referring to FIG. 6A, an order queue 600 includes four orders, Orders 1-4, having order quantities of "40," "40," "60," and "20," respectively. Orders 1 and 2 are associated with "Decrease Priority" identifiers indicating that these orders can be moved down to a lower priority level, and Orders 3 and 4 are associated with "Standard Priority" identifiers indicating that priority levels of these orders should not be modified. Also, the order queue 600 illustrates an incoming order, Order 5, having an order quantity of "60" that will be put at the back of the order queue 600. Also, Order 5 is to be preferably moved to a higher priority level.

FIG. 6B illustrates an arrangement of orders in the order queue 600 once Order 5 is placed in the order queue 600. In a FIFO system, Order 5, as illustrated in FIG. 6B, would be preferably placed at the back of the order queue 600. Then, once Order 5 is placed in the order queue 600, the order priority modification component 310 may attempt to increase the priority level of Order 5. Since the priority levels of Orders 1 and 2 can be decreased, the order priority modification component may use these orders to increase priority levels of Order 5 in the order queue 600. However, since the order quantity that can be transferred to a higher priority level is limited by an order quantity of an order at that higher priority level, there is no single order at the higher priority level that can be used to increase a priority level of the entire order quantity of Order 5. However, the combination of Orders 1 and 2 can be used to increase the order quantity of Order 5 to higher priority levels. Thus, the priority level of order quantity of 40 is increased to the priority level of the queue position of Order 1, as illustrated at 602, and the priority level of order quantity of 20 is increased to the priority level of the queue position of Order 2. Then, the order quantity of Order 1 is moved to the priority level of the original queue position of Order 5, as illustrated at 606. Also, the priority level of order quantity of 20 associated with Order 2 is decreased to a lower priority level.

FIG. 6B illustrates changing the priority level of the full order quantity associated with Order 1 to the lower priority level in the order queue. However, it should be understood that different embodiments are possible as well. For example, if two or more orders are used to increase another order's priority level, a higher percentage of Order 2 could be transferred to a lower priority level than that of Order 1. For example, the full order quantity of 40 associated with Order 2 and an order quantity of 20 associated with Order 1 could be moved to lower priority levels. Alternatively, different percentages could be defined to control what percentage of each order should be used to increase another order's priority level.

FIG. 6C illustrates order positions in the order queue 600 once the order priority modification component 310 changes priority levels of the orders. Thus, as illustrated in FIG. 6C, the first portion of Order 5 corresponding to the order quantity of 40 is first to be matched, and the second portion of Order 5 corresponding to the order quantity of 20 is second to be matched in the order queue 600. Once the order quantities associated with Order 5 are filled, the next order in the order queue is Order 2 with the remaining quantity of 20. Next, the order queue 600 contains Order 3, Order 4, Order 1, and Order 2. Once again, the order quantity of Order 2 at the back of the order queue 600 is 20 since only 50% of Order 2 was used to increase the priority level of Order 5. Also, as illustrated in FIG. 6C, Order 1 is placed in front of Order 2 since the initial priority level of Order 1 was higher than that of Order 2.

It should be understood that changing order priority levels are not limited to the methods described in reference to FIGS. 5A-5C and 6A-6C, and different methods could also be used. Also, in FIGS. 6A-6C, instead of transferring only a portion of an order at the higher priority level to a lower priority level, the entire order quantity could be transferred instead. Also, it should be understood that the present embodiments are not limited to FIFO based systems, and could be applied in other systems as well, such as pro-rata systems, for example, the embodiments of which will be described in greater detail below.

Alternatively, rather than allowing an order at a lower priority level to be able to be transferred to much higher priority level, where there is a number of orders having priority levels between the higher priority and the lower priority, one of the number of orders may include a priority preference that does not allow other orders to be moved from a priority level lower than that of the limiting order's priority level to the higher priority level. In such an embodiment, using the priority preference associated with that one order, another order may be prevented from being transferred to a higher priority level than that of the limiting order.

2. Pro-Rata System

In a pro-rata system, an order is typically placed into an order queue associated with a specific order price, and the order is not assigned any specific priority. However, an exchange will match each order in proportion to the order's size compared to the sizes of other pending orders at the same price level. In such a system a bigger portion of an order quantity will be filled for an order having an originally higher order quantity compared to an order having a lower order quantity. Thus, although no priority levels are actually assigned to orders in a pro-rata system, the orders are in a way "prioritized" since the orders get filled in proportion to their order quantities. In other words, a pro-rata system may use an algorithm that assigns weights determining how much of each order's quantity will get filled.

Also, even though time is not directly used in pro-rata based systems to determine which order is filled first, the time when an order is placed in an order queue is still an important factor determining what portion of the entire order quantity is filled. For example, in order to participate in trading at any price level, an order has to be at an exchange in an order queue corresponding to the order's price level.

In a pro-rata system, each order in an order queue may be assigned a priority level, or a weighing parameter, based on a total order quantity of the order that will be filled during the first round of fills compared to other orders in the order queue. Then, the priority modification component 310 may increase a portion or percentage of an order quantity that will potentially be filled during the first round of fills. In such an embodiment, if the amount of an order quantity that will be potentially filled for one order is increased based on its priority preferences, an order quantity that will be potentially filled during the same round of fills for another order may be decreased. Similarly to a FIFO-based system, orders in a pro-rata system can include identifiers defining priority preferences. For example, a trader willing to have his order moved to a lower priority level may define his priority preferences by defining the lowest order quantity that the trader is willing to get filled during the first round of fills, or during a number of consecutive fills. Then, if his order reaches an exchange and a higher order quantity of his order will be potentially filled compared to the lowest quantity specified in the order, the difference in the order quantities may be used to increase another order's quantity that will be potentially filled during the first round of fills. It should be understood that similarly to the FIFO-based systems, an exchange may provide order types that automatically define priority levels for any orders that the trader submits to that exchange.

Preferably, according to one embodiment, an algorithm may be created for changing priority levels in a pro-rata system. In such an embodiment, the algorithm may control what portion of each available order should be used to increase another order's priority level, for example. In other words, the algorithm may assign different weights to the orders, and the matching engine may use the weights to determine the order quantity to be matched for each order.

Figure 7A:
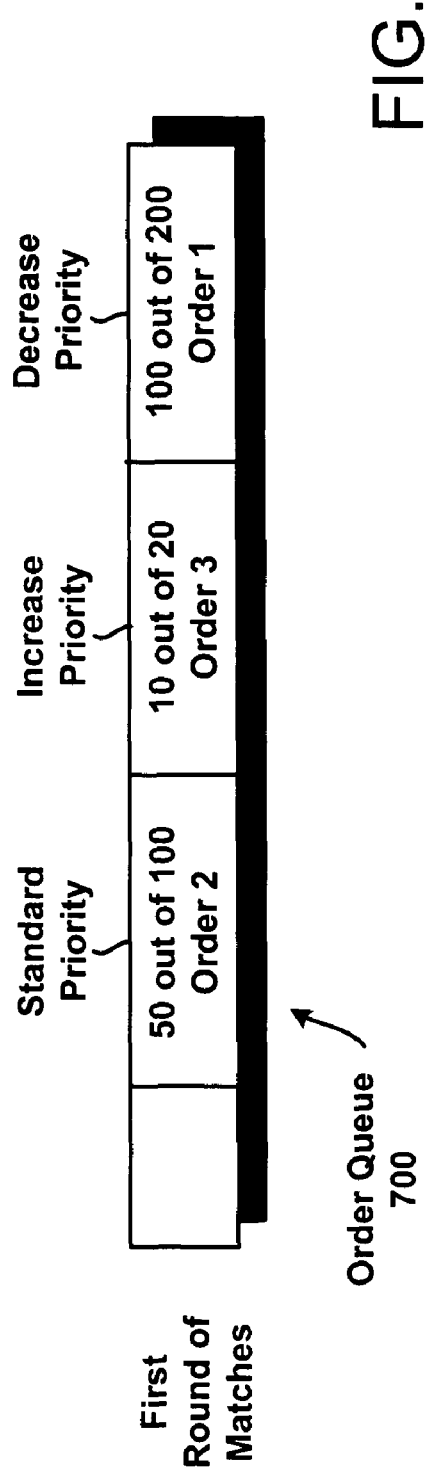
FIGS. 7A-7B are block diagrams that attempt to graphically illustrate the process of increasing and decreasing priority levels in a pro-rata system.
Figure 7B:
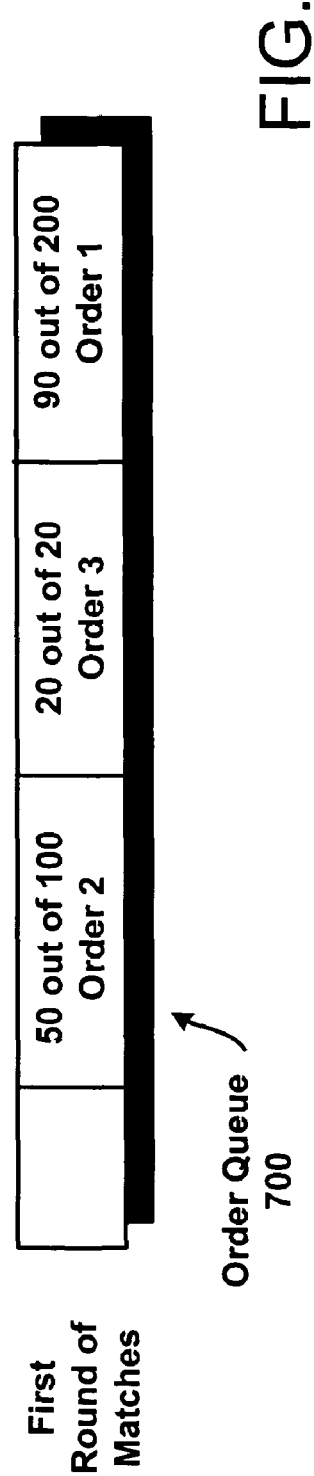

FIGS. 7A-7B attempt to graphically illustrate the process of increasing and decreasing priority levels in a pro-rata system. Referring to FIG. 7A, an order queue 700 includes three orders, Order 1, Order 2, and Order 3. Also, based on how pro-rata systems work, FIG. 7A does not show the front or the back of the order queue 700, and an order quantity that will be filled for an order is based on the size of the order compared to sizes of other orders in the order queue 700. As an example, it is assumed that 50% of each order will get filled during the first round of fills. Therefore, as illustrated in FIG. 7A, 100 out of 200, 10 out of 20, and 50 out of 100, for Orders 1, 3, and 2, respectively, will be potentially filled during the first round of fills. Also, Order 1 is associated with a "Decrease Priority" identifier indicating that a lower order quantity than 100 could be potentially filled for Order 1, and that a priority level associated with a portion or the entire quantity of 100 could be potentially transferred to another order. Order 3 is associated with an "Increase Priority" identifier indicating that a higher order quantity than an order quantity of 10 should be preferably filled. Finally, Order 2 has a "Standard Priority" indicating that the priority level of the order should not be increased or decreased.

According to one embodiment, the order priority modification component 310 may attempt to change priority levels associated with the order quantity of 100 of Order 1, and that associated with the remaining order quantity of 10 corresponding to Order 3. It should be understood that before changing priority levels of each order, the order priority modification component may determine if there are any priority preference limitations associated with Order 1. For example, a trader who defines priority preference limitations may specify the highest order quantity that can be moved to a lower priority level. Assuming that the priority preferences of Order 2 are such that the entire order quantity should preferably be put at the highest possible priority level, the order priority modification component 310 may determine if the priority level for the order quantity of 10 can be transferred from Order 1. If so, the order priority modification component 310 may decrease the order quantity to be filled during the first round of fills for Order 1 by 10, and increase the order quantity to be potentially filled during the first round of fills for Order 2 by the same quantity of 10.

FIG. 7B illustrates order quantities for each order in the order queue 700 after modifying priority levels associated with Order 1 and Order 3. Thus, the order quantity of Order 3 that will be potentially filled during the first round of fills is now 20, and the order quantity of Order 1 that will be potentially filled during the first round of fills is now 90. It should be understood that changing priority levels in a pro-rata system is not limited to using a single order to increase the order quantity to be potentially filled for another order, and more than one order could be potentially used to increase the priority level of an order quantity corresponding to a single order.

3. Fees for Priority Modifications

When priority levels of orders in an order queue are changed, one or more orders are potentially getting moved to lower priority levels. According to one embodiment, a trader who is potentially gaining a position closer to the front of the order queue will preferably pay higher per-trade fees, some or all of which, can be applied to an account of another trader who is giving up his higher priority level position in the order queue. Also, an exchange may charge a portion of such a fee for changing priority levels of the orders. It should be understood that the fee being paid by a trader who is gaining a higher priority level may be a direct fee, such as when the fee, or a portion thereof, is transferred directly between the traders' accounts. Alternatively, the fee could be indirect, such as when the fee is first transferred to an exchange, and then the exchange may apply the entire fee or a portion thereof to an account of the trader who is losing his higher priority level in the order queue.

It should be understood that the amount that is charged for changing priority levels of orders in an order queue may depend on many factors. For example, the fee may be based on a difference between priority levels of orders, a number of orders between the order at the higher priority level and the lower priority level, the total order quantity between the two orders, time of day, type of orders, or an order quantity that is transferred to a higher priority level. However, it should be understood that different factors could also be used.

Also, it should be understood that a trader may be charged for obtaining a higher priority level when the trader's order, once moved to the higher priority level, is actually filled. However, in another embodiment, a portion of the fee could be applied regardless of whether the order will get filled. Alternatively, a portion of the fee may be payable by the trader at the time when the trader's order is moved to the higher priority level, and the remaining portion may be charged when the order actually gets filled. It should be understood that many different fee application methods are possible as well.

In one embodiment, such fees may be controlled by an exchange. However, alternatively, traders could take an active role in setting costs for moving orders to different priority levels. For example, a trader who is willing to give up an order priority of one or more of his orders may "advertise" his willingness to do so, and other trader could potentially place bids to move their orders to the "advertised" order priority. A trader who "advertises" his priority level could define a minimum price level at which other traders can start placing their bids, as well as a specific time and date when the offer will no longer be available. Also, such trader could define the lowest priority level to which his is willing to drop with his order. In such an embodiment, different traders could submit their bids to obtain the higher priority level until the end of a bid-placing time period that may be user configurable, and the highest bid may be selected at the end of such period. Alternatively, the trader who initiates advertising of his priority level may end the bid-placing process at any time by selecting one of the bids. Once one of the bids is selected, an order corresponding to that bid may be moved to a higher priority level for which a trader was bidding. Alternatively, a matching engine may be configured to provide the high priority level to the first bidder that offers the specified price, assuming that the bidder meets any limitations defined by the trader offering the high priority level, such as a minimum price level.

It should be understood that in one embodiment only trader having their orders already in an order queue may be allowed to place bids for higher priority levels. In such an embodiment, a trader who wins the bidding process may have one of his order's priority level modified to a higher priority level. Alternatively, no such limitation may be imposed allowing a trader who wishes to place an order to first bid for the high order priority in a queue. In such an embodiment, when the trader obtains the high priority level, an order for that trader may be automatically placed on the electronic exchange. For example, the trader could submit an order type allowing a trader to bid for a priority level in an order queue, and then once the trader obtains a desired high order priority level, the order is automatically submitted to the exchange and placed at the high priority level. Also, an order of a trader who is offering his order priority level for sale may be moved to a lower priority level in an order queue, or may be removed from the order queue.

In one embodiment, a trading interface may display priority information in relation to market depth, such as indicators corresponding to priority levels of trader's orders as well as other pending orders at all or some price levels. Also, the trading interface could color code priority level indicators of those orders for which other traders can place bids. Also, it should be understood that when such priority level indicators are displayed via a trading interface, a trader could change priority preferences for any of his orders at any time until the orders are filled. Such indicators could be displayed via a commercially available trading application such as X_TRADER® from Trading Technologies International, Inc. of Chicago, Ill. X_TRADER® also provides an electronic trading interface, referred to as MD Trader™, in which working orders and/or bid and ask quantities are displayed in association with a static axis of prices. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, U.S. patent application Ser. No. 10/125,894, entitled "Trading Tools For Electronic Trading," filed on Apr. 19, 2002, and U.S. patent application Ser. No. 10/376,417, entitled "A System and Method for Trading and Displaying Market Information in an Electronic Trading Environment," filed on Feb. 28, 2003, the contents of each are incorporated herein by reference. However, it should be understood that the indicators could also be displayed using any other automatic trading applications as well. Additionally, the preferred embodiments are not limited to any particular product.

Also, before the trader decides to even place a bid for a priority level of another order in an order queue, a trader preferably will be able to view his order position in an order queue. Thus, a trader can decide whether paying a certain price for moving his order to a higher priority level makes sense considering his current priority level. In one embodiment, an exchange could provide queue position information. Alternatively, order positions could be estimated using methods that have been described in U.S. patent application Ser. No. 10/452,567, filed on May 30, 2003, entitled "System and Method for Estimating Order Position," the contents of which are incorporated herein by reference. The present invention can also use the methods and apparatus for estimating the number of orders in a price order queue, and for estimating the size of each order, the methods of which have been described in U.S. patent application Ser. No. 10/348,134, filed on Jan. 21, 2003, entitled "Method and Apparatus for Providing Order Queue Information," the contents of which are also incorporated herein by reference.

In one embodiment, it should be understood that other than allowing all traders to advertise and offer for sale their queue positions, an exchange may restrict the process to the highest order position in an order queue. In such an embodiment, only a trader whose order is first to be filled in an order queue, or having the highest order quantity to be filled during one or more first round of fills, may be able to offer his position for sale. Further, such limitations may be extended to price levels at which the trader has his order. For example, a trader having the highest priority level at the inside market price could be able to advertise his priority. When a trader communicates to an exchange his willingness to have his priority level trader by selecting a selection input on a trading interface, for example, the exchange could send that information to other traders trading that tradeable object at the exchange. In one embodiment, upon receiving a signal from the exchange, each trading interface may display an indicator in association with a price level defining another trader's willingness to have his highest priority level traded. Then, for example, the first trader who selects the indicator may receive the highest priority level in the order queue. Once again, as mentioned earlier, there could be limitations as to which traders can actually bid for the highest priority level. In one embodiment, only traders having pending orders in the order queue may be provided with indicators defining another trader's offer, or any trader who is not even currently participating in the market may have access to such indicators.

Figure 8:
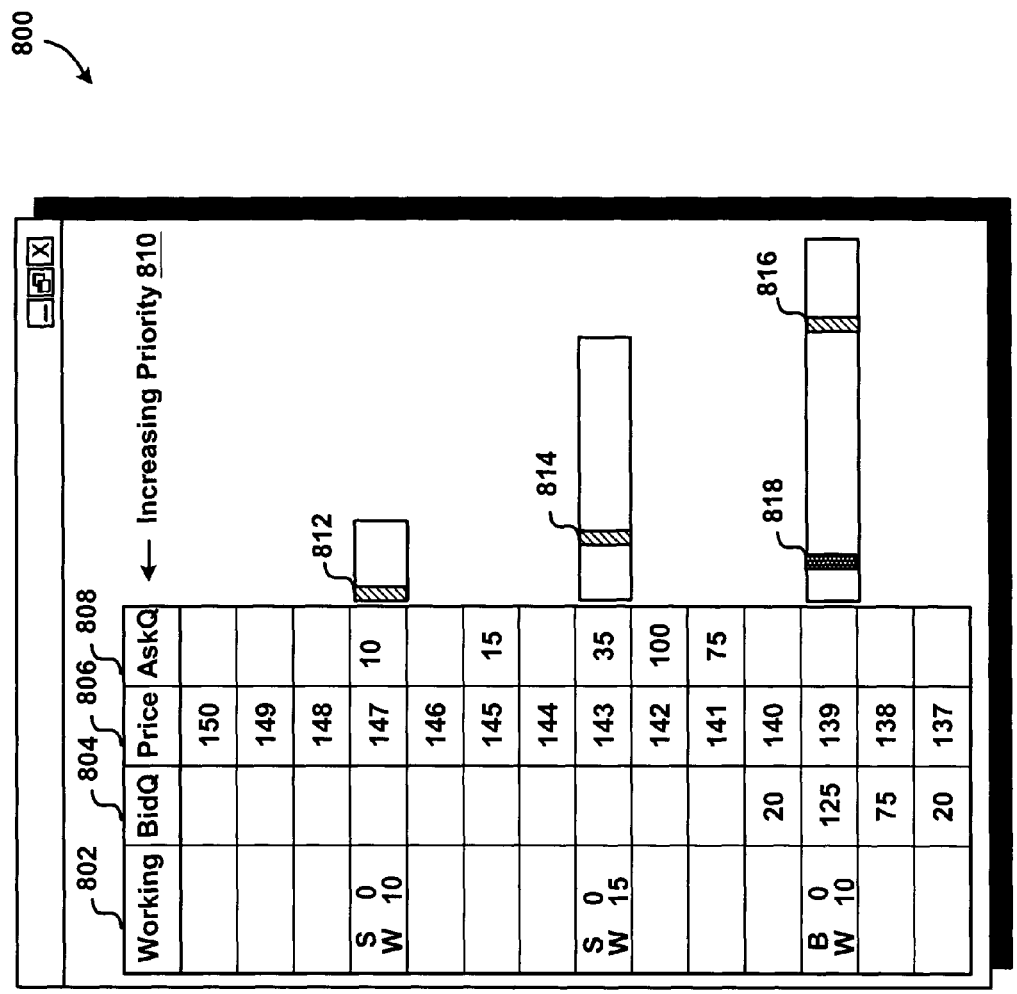
FIG. 8 a block diagram illustrating a graphical interface for displaying order queue priority related information.

Rather than limiting trader's ability to advertise the highest priority levels, any trader could advertise his priority level. Also, in such an embodiment, a trading interface could display trader's order position as well as other orders for which the trader can place bids. FIG. 8 is a block diagram illustrating a graphical interface 800 for displaying order queue priority related information.

The trading interface 800 displays market information via a market information region, such as a current Bid Quantities ("BidQ") region 804 and a current Ask Quantities ("AskQ") region 808, as well as trader-related information, such as trader's Working Orders ("Working") region 802. The price axis 806 and variations thereof are described in U.S. patent application Ser. No. 09/590,692, entitled "Click Based Trading With Intuitive Grid Display of Market Depth," in the U.S. patent application Ser. No. 09/971,087, entitled "Click Based Trading With Intuitive Grid Display of Market Depth And Price Consolidation," and in U.S. patent application Ser. No. 10/376,417, entitled "System and Method for Trading and Displaying Market Information in an Electronic Environment."

When a trader submits an order to an exchange, the trading interface 800 may display a position of an order in an order queue. As illustrated in FIG. 8, the trading interface displays three order queues at price levels of 147, 143, and 139, respectively. The three order queues include three orders that have been submitted by the trader, such as orders 812, 814, and 816. It should be understood that a trader may configure an indicator type or a color scheme that should be used to distinguish the trader's orders from other orders that are displayed via the trading interface. Also, the trading interface 800 may display orders that the trader may use to improve his priority level. Such orders may include orders for which the trader may place bids, for example. One such order, an order 818, is illustrated in relation to the order queue associated with the price level of 139. In one embodiment, to place a bid for the priority level of the order 818, a trader could simply select the order indicator 818 that in turn may invoke another window via which the trader may view the highest pending bid, or place his own bid, for example.

Also, it should be understood that once a trader views his order's position in an order queue, the trader could at any time decide to "advertise" his order's priority level for bidding by other traders. In one embodiment, the trading interface could display a graphical selection input that could be used by a trader to initiate the "advertising" process. Then, once such input is selected, the trader could select an order indicator associated with an order that the trader is willing to have moved to a lower priority level. It should be understood that many other embodiments are possible as well.

The above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for trading order priority levels in an electronic trading environment may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for trading order priority levels in an electronic trading environment, comprising:
receiving by a computing device a first order message for a first order to buy or sell a tradeable object, the received first order message comprising an order price and a first priority level parameter, wherein the first priority level parameter comprises a condition that determines a priority level for at least a portion of an order quantity associated with the first order; and
prioritizing the first order in an order queue at an electronic exchange based on the order price, the first priority level parameter, and a time when the first order message is received, wherein the first order is arranged in the order queue for the order price according to the time when the first order message is received and prioritized within the order queue according to the first priority level parameter in the first order message and a second priority level parameter associated with a second order in the order queue.

2. The method of claim 1, further comprising:
preventing the first order from being added to the order queue when at least a portion of the order quantity of the first order cannot be prioritized based on the first priority level parameter.

3. The method of claim 1, wherein a first portion of the first order is in the order queue at a position determined based on the price and the time when the first order is received, and wherein a second portion of the first order is at a position in the queue determined based on the prioritizing.

4. The method of claim 1, wherein prioritizing the first order comprises:
determining that the second order exists in the order queue that satisfies the first priority level parameter of the first order; and
assigning at least a portion of an order quantity of the second order to the first order.

5. The method of claim 4, wherein the second priority level parameter of the second order allows the assigning of the at least the portion of the order quantity of the second order to the first order.

6. The method of claim 5, wherein the second priority level parameter of the second order defines a minimum priority to which the at least the portion of the order quantity of the second order can be re-assigned.

7. The method of claim 6, wherein the minimum priority is based on an order quantity or a number of orders pending in front of the at least the portion of the quantity of the second order upon re-assignment.

8. The method of claim 5, wherein the priority level parameter associated with the second order defines how many times the second order can be used to satisfy a priority level parameter of other orders.

9. The method of claim 1, wherein the first priority level parameter further comprises a limit that defines when at least a portion of the quantity of the first order can be prioritized based on the first priority level parameter.

10. The method of claim 9, wherein the limit is based on a number of orders between a potential position of the at least the portion of the quantity of the first order in the order queue upon prioritizing based on the order price, the first priority level parameter, and the time, and a position of the order in the queue upon prioritizing the first order based on the order price and the time.

11. The method of claim 9, wherein the limit is based on an order quantity pending between a position in the order queue, corresponding to the first priority level parameter and a position in the order queue corresponding to the second priority level parameter.

12. The method of claim 1, wherein the order queue at the electronic exchange is processed so that orders are removed from the order queue based on a first in first out (FIFO) priority.

13. The method of claim 1, wherein the order queue at the electronic exchange is processed so that orders are removed from the order queue based on a pro-rata priority.

14. The method of claim 1, wherein prioritizing the first order comprises:
  assigning at least a portion of an order quantity of the second order to the first order; and
  maintaining a remaining portion of the order quantity of the second order in the order queue at a position corresponding to the first priority level parameter.

15. The method of claim 1, further comprising:
  paying a fee by a user associated with the first order for prioritizing the first order.

16. The method of claim 15, further comprising:
  receiving the fee by a user associated with the second order.

17. The method of claim 15, wherein a portion of the fee is collected by the electronic exchange.

18. The method of claim 17, wherein the fee comprises a direct fee to be transferred from an account of the user associated with the first order and a user associated with the second order.

19. The method of claim 17, wherein the fee comprises an indirect fee to be transferred via the electronic exchange between an account of the user associated with the first order and an account of a user associated with the second order.

20. The method of claim 15, wherein at least a portion of the fee is to be paid only when at least a portion of the order quantity of the first order is filled.

21. A computer readable medium having stored therein instructions to execute a method for trading order priority levels in an electronic trading environment, comprising:
  receiving by a computing device a first order message for a first order to buy or sell a tradeable object, the received first order message comprising an order price and a first priority level parameter, wherein the first priority level parameter comprises a condition that determines a priority level for at least a portion of an order quantity associated with the first order; and
  prioritizing the first order in an order queue at an electronic exchange based on the order price, the first priority level parameter, and a time when the first order message is received, wherein the first order is arranged in the order queue for the order price according to the time when the first order message is received and prioritized within the order queue according to the first priority level parameter in the first order message and a second priority level parameter associated with a second order in the order queue.

* * * * *